(12) United States Patent
Cao (10) Patent No.: US 12,088,902 B2
(45) Date of Patent: Sep. 10, 2024

(54) CAMERA MODULE AND ELECTRONIC DEVICE

(71) Applicant: CHANGXIN MEMORY TECHNOLOGIES, INC., Hefei (CN)

(72) Inventor: Kanyu Cao, Hefei (CN)

(73) Assignee: CHANGXIN MEMORY TECHNOLOGIES, INC., Hefei (CN)

(*) Notice: Subject to any disclaimer, the term of this patent is extended or adjusted under 35 U.S.C. 154(b) by 118 days.

(21) Appl. No.: 17/955,636

(22) Filed: Sep. 29, 2022

(65) Prior Publication Data

US 2023/0015891 A1 Jan. 19, 2023

Related U.S. Application Data

(63) Continuation of application No. PCT/CN2022/118317, filed on Sep. 13, 2022.

(30) Foreign Application Priority Data

Aug. 23, 2022 (CN) .......................... 202211014502.0

(51) Int. Cl.
*H04N 23/55* (2023.01)
*G02B 3/00* (2006.01)
*G03B 17/08* (2021.01)

(52) U.S. Cl.
CPC ........... *H04N 23/55* (2023.01); *G02B 3/0062* (2013.01); *G03B 17/08* (2013.01)

(58) Field of Classification Search
CPC ........ H04N 23/55; H04N 23/52; H04N 23/57; G02B 3/0062; G03B 17/08; G03B 30/00
See application file for complete search history.

(56) References Cited

U.S. PATENT DOCUMENTS

| 6,483,101 B1 | 11/2002 | Webster |
| 6,606,135 B2 | 8/2003 | Nakanishi |
| 6,759,642 B2 | 7/2004 | Hoshino |
| 6,980,379 B1 | 12/2005 | Gurevich |

(Continued)

FOREIGN PATENT DOCUMENTS

| CN | 1655063 A | 8/2005 |
| CN | 102130138 A | 7/2011 |

(Continued)

OTHER PUBLICATIONS

International Search Report in the international application No. PCT/CN2022/118317, mailed on Feb. 21, 2023, 6 pages.

(Continued)

*Primary Examiner* — Timothy J Henn
(74) *Attorney, Agent, or Firm* — Kilpatrick Townsend & Stockton LLP (57) ABSTRACT

A camera module includes a body and a cover, which are matched to form a sealed cavity; an image sensor and a micro-lens array, which are disposed in the sealed cavity; and an optical matching medium, filling the sealed cavity. The cover includes an objective lens, the center line of the image sensor is coincident with the optical axis of the objective lens, the micro-lens array is located between the image sensor and the objective lens, the optical matching medium is disposed between the objective lens and the micro-lens array, and the refractive index of the optical matching medium is greater than that of air.

20 Claims, 7 Drawing Sheets

(56) References Cited

U.S. PATENT DOCUMENTS

| | | |
|---|---|---|
| 8,319,303 B2 | 11/2012 | Yang |
| 9,360,735 B2 | 6/2016 | Lim |
| 2002/0039157 A1 | 4/2002 | Nakanishi |
| 2005/0270667 A1 | 12/2005 | Gurevich |
| 2008/0030703 A1 | 2/2008 | Akamatsu |
| 2012/0012960 A1 | 1/2012 | Yang |
| 2012/0013787 A1 | 1/2012 | Chiang |
| 2020/0124945 A1* | 4/2020 | Kim .................. G03B 17/12 |
| 2022/0231057 A1* | 7/2022 | Hatano ............ H01L 27/1462 |

FOREIGN PATENT DOCUMENTS

| | | | |
|---|---|---|---|
| CN | 104241310 A | 12/2014 | |
| CN | 112770033 A * | 5/2021 | ............ G03B 17/04 |
| CN | 113608342 A | 11/2021 | |

OTHER PUBLICATIONS

John J. Cargille, "Immersion Oil and the Microscope", New York Microscopical Society Yearbook, 1964. Second Edition ©1985, John J. Cargille—All rights reserved, https://cargille.com/wp-content/uploads/2018/03/Immersion_Oil_and_the_Microscope, 6 pages.

* cited by examiner

CAMERA MODULE AND ELECTRONIC DEVICE

CROSS-REFERENCE TO RELATED APPLICATION

This is a continuation of International Application No. PCT/CN2022/118317, filed on Sep. 13, 2022 and entitled "CAMERA MODULE AND ELECTRONIC DEVICE", which claims priority to Chinese Patent Application No. 202211014502.0, filed to Chinese Patent Office on Aug. 23, 2022 and entitled "CAMERA MODULE AND ELECTRONIC DEVICE". The contents of International Application No. PCT/CN2022/118317 and Chinese Patent Application No. 202211014502.0 are hereby incorporated by reference in their entireties.

TECHNICAL FIELD

Embodiments of the disclosure relate to the technical field of optical imaging, in particular to a camera module and an electronic device.

BACKGROUND

A camera module may generally include an objective lens, an image sensor, and a printed circuit board electrically coupled to the image sensor, where the objective lens and the image sensor are disposed opposite to each other, incident light is projected onto the image sensor through the objective lens, and an optical signal is converted into an electrical signal through processing of the image sensor and transmitted to the printed circuit board. However, the current camera module has a problem that it is difficult to further improve the resolution.

SUMMARY

In a first aspect, the embodiments of the disclosure provide a camera module, which includes:
 a body and a cover, which are matched to form a sealed cavity;
 an image sensor and a micro-lens array, which are disposed in the sealed cavity;
 an optical matching medium, filling the sealed cavity;
 where the cover includes an objective lens, the center line of the image sensor is coincident with the optical axis of the objective lens, the micro-lens array is located between the image sensor and the objective lens, the optical matching medium is disposed between the objective lens and the micro-lens array, and the refractive index of the optical matching medium is greater than that of air.

In a second aspect, the embodiments of the disclosure further provide an electronic device, which includes the camera module described in the above embodiment, the camera module being configured to acquire an optical image; the electronic device further includes a display, the display is electrically coupled with the camera module, and the display is configured to display the optical image.

DETAILED DESCRIPTION

A camera module may generally include an objective lens, an image sensor, and a printed circuit board electrically coupled to the image sensor, where the objective lens and the image sensor are disposed opposite to each other, incident light is projected onto the image sensor through the objective lens, and an optical signal is converted into an electrical signal through processing of the image sensor and transmitted to the printed circuit board. It is to be noted that when light propagates in a medium with a lower refractive index, because the refractive index is inversely proportional to wavelength, the wavelength of the light in the medium is longer, the diameter of a corresponding object image is greater, and therefore, the resolution between adjacent object images is lower. In a common camera module, a medium between an objective lens and an image sensor is air, and the refractive index of air is low, so that the resolution of the camera module is low. For example, in the common camera module, the resolution of the camera module can generally only reach about 0.5 microns (um). In this case, even if an image sensor with a higher resolution is used, the resolution of the camera module cannot be improved.

In view of this, the embodiments of the disclosure provide a camera module and an electronic device, including: an objective lens and a micro-lens array, an optical matching medium is disposed between the objective lens and the micro-lens array, and the refractive index of the optical matching medium is greater than that of air. Compared with the common camera module in which air is used as a medium between the objective lens and the image sensor, in the embodiment of the disclosure, the optical matching medium with high refractive index is disposed between the objective lens and the micro-lens array, so that the wavelength of light in the medium can be shortened, the diameter of an corresponding object image is reduced. Therefore, photosensitive units with smaller sizes and smaller pitches can be disposed on the image sensor, and the resolution of the camera module can be further improved.

In order to make the purpose, the technical solutions and the advantages of the disclosure clearer, the technical solutions in the embodiments of the disclosure will be described in detail below in combination with the drawings in the preferred embodiments of the disclosure. In the drawings, same or similar reference numerals refer to the same or similar components or components having the same or similar function throughout. The described embodiments are only some rather than all embodiments of the disclosure. The embodiments described below by reference to the drawings are exemplary only for explaining the disclosure and are not to be understood as limiting the disclosure. All other embodiments obtained by those skilled in the art based on the embodiments of the disclosure without creative efforts shall fall within the protection scope of the disclosure. The embodiments of the disclosure will be described in detail below with reference to the drawings.

It is to be noted that the camera module in the embodiment of the disclosure can be applied to camera systems of electronic devices such as a personal computer, a portable display device, a smart phone and the like.

Figure 1:
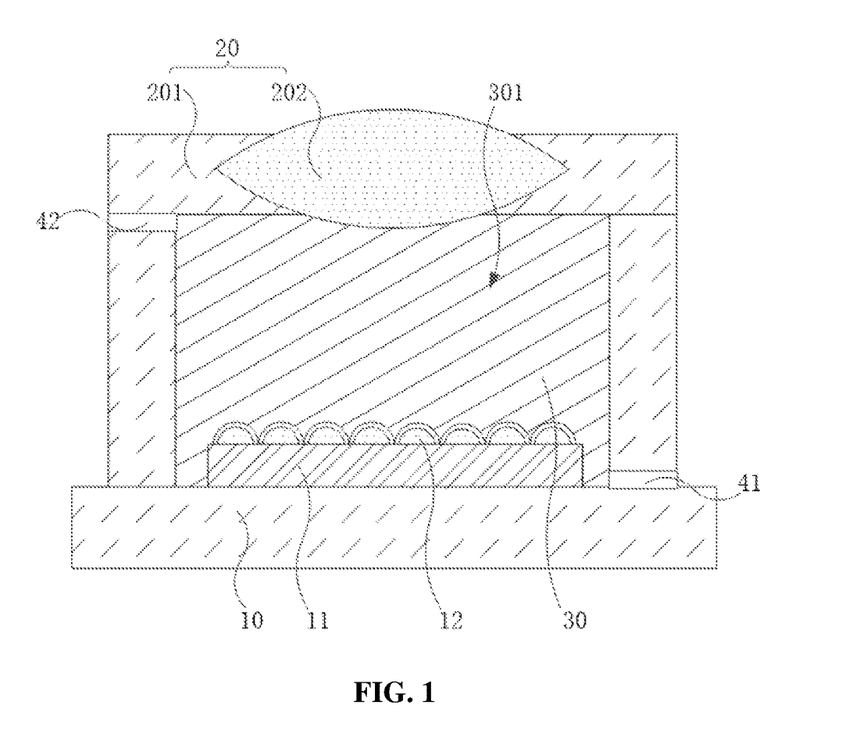
FIG. 1 is a schematic structural diagram I of a camera module according to an embodiment of the disclosure.
Figure 2:
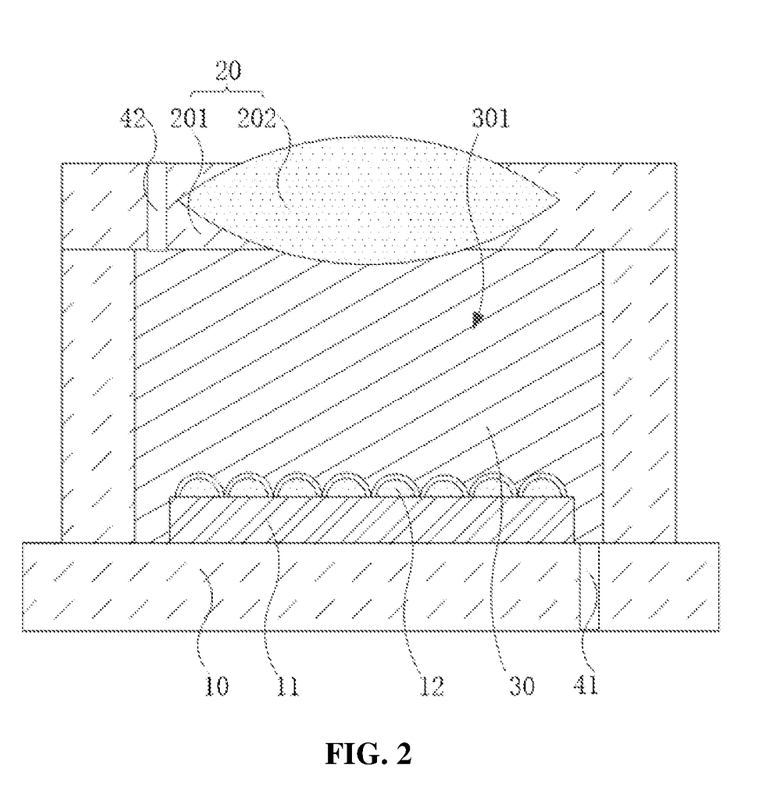
FIG. 2 is a schematic structural diagram II of a camera module according to an embodiment of the disclosure.

Referring to FIGS. 1 and 2, the camera module includes a body 10 and a cover 20, which are matched to form a sealed cavity 301. An image sensor 11 and a micro-lens array 12 are disposed in the sealed cavity 301, and an optical matching medium 30 fills the sealed cavity 301. Exemplarily, the body 10 may, for example, be of a barrel-shaped structure, the body 10 includes a bottom and a side wall connected to the bottom, the side wall is disposed around the bottom, an bore is defined at an end of the side wall facing away from the bottom, and the cover 20 is configured to block the bore and is connected with the body 10 in a sealing manner, so that the body 10 and the cover 20 form the sealed cavity 301. In some embodiments, a sealant or seal ring may be disposed between the cover 20 and the body 10 so as to prevent leakage of the optical matching medium 30 from the sealed cavity 301. The image sensor 11 and the micro-lens array 12 are disposed in the sealed cavity 301, so that the image sensor 11 and the micro-lens array 12 can be prevented from being in contact with the external environment, the imaging quality can be improved, and the service life of the camera module can be prolonged.

The cover 20 includes an objective lens 202 for optical imaging. A surface of the objective lens 202 close to the image sensor 11 is in contact with the optical matching medium 30, while a surface of the objective lens 202 away from the image sensor 11 is not in contact with the optical matching medium 30. In the embodiment, the center line of the image sensor 11 is coincident with the optical axis of the objective lens 202, so that the image sensor 11 and the objective lens 202 are disposed opposite to each other. Exemplarily, by arranging the distance between the image sensor 11 and the object image, the focal point of the objective lens 202 is aligned on the image sensor 11, so that the objective lens 202 images an optical image on the image sensor 11.

Exemplarily, the cover 20 may further include a cover plate 201, through which the objective lens 202 may be connected to the body 10. For example, the objective lens 202 may be in clamping connection with the cover plate 201, but is not limited thereto. The cover plate 201 can block the bore of the body 10 and is connected with the body 10 in a sealing manner, and the objective lens 202 is connected with the cover plate 201 in a sealing manner, so that the cover plate 201, the objective lens 202 and the body 10 jointly define the sealed cavity 301.

In the embodiment, the image sensor 11 includes a CCD or a CMOS device. The image sensor 11 is configured to convert an optical signal for imaging of the objective lens 202 into an electrical signal. The charge coupled device image sensor, also known as a CCD image sensor, is a semiconductor device capable of converting an optical image into a digital signal. The CCD image sensor has the advantages of being high in image quality, high in image resolution and the like, and is low in power consumption and easy to integrate. The complementary metal oxide semiconductor device image sensor, also known as a CMOS image sensor, is a voltage-controlled amplifying device. The CMOS image sensor has the advantages of high processing speed, low cost and the like. According to the embodiment of the disclosure, according to different requirements of actual use, a corresponding image sensor 11 can be selected.

The micro-lens array 12 may include a plurality of micro-lenses distributed in an array. Of course, in some other embodiments, the image sensor 11 may also be one or more of image sensors such as a Photosensitive Diode (PD) array, a focal plane array, a multispectral sensor, or the like.

Exemplarily, a printed circuit board, also known as a circuit board or PCB, may also be disposed in the sealed cavity 301. The printed circuit board is located on one side of the image sensor 11 facing away from the objective lens 202. The image sensor 11 is electrically coupled with the printed circuit board, for example, the image sensor 11 may be connected to the printed circuit board via a ball grid array, so that an electrical signal generated by the image sensor 11 from the incident light is transmitted to the printed circuit board and a digital image signal is output by the printed circuit board. Exemplarily, the printed circuit board may be connected to the bottom of the body 10, so that the printed circuit board is mounted on the body 10.

In the embodiment, the micro-lens array 12 is located between the image sensor 11 and the objective lens 202. The micro-lens array 12 is an array of lenses having a clear aperture and a relief depth in an order of microns. The micro-lens array 12 may include a plurality of micro-lenses distributed in an array. The micro-lenses in the micro-lens array 12 may all be convex lenses so as to generate a converging effect on the incident light.

It is to be noted that the CMOS image sensor has a pixel array, which is a key functional module directly related to the image reproduction capability. The pixel array includes a Front Side Illuminated (FSI) pixel array and a Back Side Illuminated (BSI) pixel array. In the embodiment, the FSI pixel array or BSI pixel array can be selected according to actual needs, and is not specifically limited herein.

In the structure of the FSI pixel array, a color filter layer (namely, a color filter array), a metal layer, and a photosensitive layer may be sequentially disposed in a stacking manner, where the micro-lens array 12 covers one side of the color filter layer facing away from the metal layer. The color filter layer may, for example, include color filters distributed repeatedly in units of RGBW for filtering incident light to obtain light of corresponding colors, R may, for example, represent a red color filter, G may, for example, represent a green color filter, B may, for example, represent a blue color filter, and W may, for example, represent a white color filter. The metal layer includes a circuit structure formed by a plurality of layers of metal wires and is configured to transmit the photoelectric converted electrical signal to a peripheral circuit for processing, and the CMOS process utilizes a control circuit and a signal processing circuit as peripheral circuits. A substrate of the metal layer is a silicon oxide material, a plurality of layers of metal wires are placed therein, a circuit structure is formed in an electric connection mode and configured for transmitting electrical signals, and a gap between every two adjacent metal wires forms an optical channel of the metal layer. A plurality of photosensitive units are disposed in the photosensitive layer, the color filter in each color filter layer is correspondingly provided with one photosensitive unit, and the orthographic projection of the color filter in the color filter layer on the photosensitive layer covers the corresponding photosensitive unit. A substrate material of the photosensitive layer may be silicon, and the photosensitive unit may be, for example, a Photosensitive Diode (PD) for photoelectric conversion of received incident light. Because metal wires need to be placed on the metal layer between the color filter layer and the PD, a certain distance needs to be reserved between the adjacent PDs. The optical channel of the photosensitive layer is communicated with and aligned with the optical channel of the metal layer, the PD is located in the optical channel of the photosensitive layer, so that incident light passes through the color filter layer, enters the optical channel of the metal layer and the optical channel of the photosensitive layer in sequence to reach the PD, and the PD encounters photons to generate a photoelectric effect to realize photoelectric conversion, and a digital image signal is output through the circuit structure of the metal layer.

In the structure of the BSI pixel array, the positions of the metal layer and the photosensitive layer in the structure are interchanged, that is, the color filter layer, the photosensitive layer and the metal layer are sequentially arranged in a stacking manner, where the micro-lens array 12 covers the side of the color filter layer facing away from the photosensitive layer. Because the metal layer is located below the PD, the distance between the adjacent PDs can be relatively shortened. Other structural features in the structure of the BSI pixel array may be the same as those of the structure of the FSI pixel array, and no more elaboration will be made herein. After passing through the color filter layer, incident light directly reaches the PD through the optical channel of the photosensitive layer, and does not need to pass through the metal layer, so that the path of light is shortened. Because the optical channel does not need to make space due to metal wiring of the metal layer, the distance between adjacent pixels can be appropriately shortened.

In a possible implementation mode, the micro-lenses in the micro-lens array 12 may be in one-to-one correspondence with the photosensitive units in the image sensor 11, so that that incident light can be transmitted to the photosensitive units of the image sensor 11 through the micro-lenses. Exemplarily, the optical axis of the micro-lenses may be coincident with the center line of corresponding color filter layer and with the center line of the corresponding PD. In another possible implementation mode, one micro-lens in the micro-lens array 12 may correspond to a group of photosensitive units in the image sensor 11. Here, "a group of photosensitive units" may be, for example, a group of RGBW color filter layers and a corresponding group of PDs. Exemplarily, the micro-lens may correspond to a group of RGBW color filter layers, and each color filter in the group of RGBW color filter layers corresponds to a PD.

By arranging the micro-lens array 12, incident light can be subjected to angle regulation and control through the micro-lens array 12 to realize light convergence, so that the incident light is gathered in different photosensitive units in the image sensor 11, and crosstalk of the light between adjacent photosensitive units in the image sensor 11 is reduced. Furthermore, by arranging the micro-lens array 12, the photoelectric conversion efficiency can be improved, and the imaging quality can be improved. It is to be noted that the manufacturing cost of the micro-lens array 12 is low, so that the production cost of the camera module can be reduced.

Figure 3:
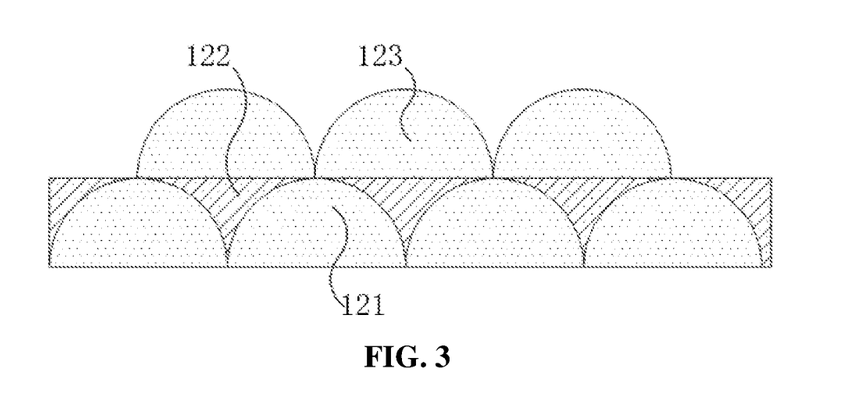
FIG. 3 is a schematic structural diagram I of a micro-lens array according to an embodiment of the disclosure.
Figure 4:
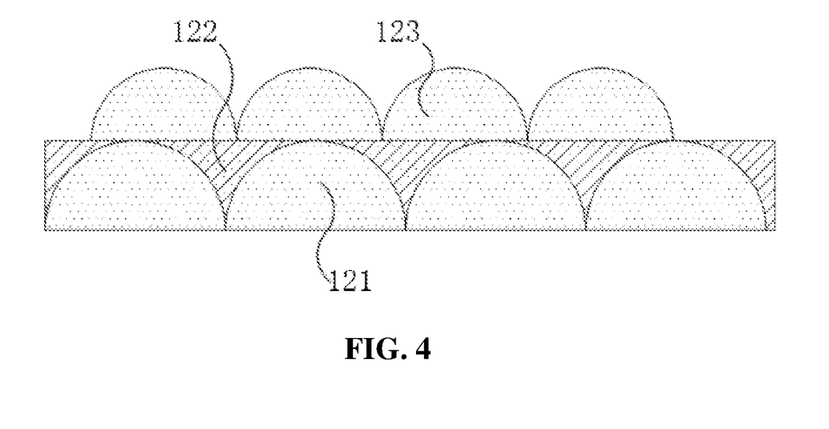
FIG. 4 is a schematic structural diagram II of a micro-lens array according to an embodiment of the disclosure.

In some other embodiments, referring to FIGS. 3 and 4, the micro-lens array 12 may further include a first array layer 121 and a second array layer 123 disposed in a stacking manner, and each of the first array layer 121 and the second array layer 123 includes micro-lenses distributed in an array. The first array layer 121 is located on one side of the color filter layer facing away from the photosensitive layer, the first array layer 121 is covered with a lens material 122, one side of the lens material 122 facing away from the first array layer 121 is provided with a plane, and the second array layer 123 covers the plane.

For example, referring to FIG. 3, the micro-lens in the second array layer 123 may be located between two adjacent micro-lenses in the first array layer 121, and the refractive index of the micro-lens in the second array layer 123 is greater than that of the micro-lenses in the first array layer 121. Through the arrangement, external light incident at a large angle can be subjected to angle regulation and control through the micro-lenses in the second array layer 123, so that external light incident at a large angle enter different photosensitive units in the image sensor 11, and crosstalk of the light between adjacent photosensitive units in the image sensor 11 is reduced. Furthermore, through the arrangement, the loss of the light incident at a large angle can be avoided, and the photoelectric conversion efficiency is further improved.

For example, referring to FIG. 4, the lens material 122 may have a thickness in a direction parallel to the optical axis of the lens, and the curvature of the lens in the second array layer 123 may be greater than that of the lens in the first array layer 121, so that the effective focal depth of the micro-lens in the second array layer 123 is smaller than or equal to half the thickness of the lens material 122. Through the arrangement, part of incident light can be guided to different side faces of the micro-lens in the first array layer 121 through the micro-lenses in the second array layer 123 and then converged through the micro-lenses in the first array layer 121, and crosstalk of the light between adjacent photosensitive units in the image sensor 11 can be reduced.

In the embodiment, the optical matching medium 30 is disposed between the objective lens 202 and the micro-lens array 12, and the refractive index of the optical matching medium 30 is greater than that of air. When the light propagates in the optical matching medium 30 with a higher refractive index, the wavelength of the light in the medium is shorter, and the diameter of the corresponding object image is smaller, so that the resolution between the adjacent object images is improved.

Exemplarily, one end of the optical matching medium 30 close to the objective lens 202 is in contact with the objective lens 202, and another end of the optical matching medium 30 close to the micro-lens array 12 is in contact with the micro-lens array 12. The incident light directly enters the optical matching medium 30 after passing through the objective lens 202, and directly enters the micro-lens array 12 after passing through the optical matching medium 30, so that the light is prevented from propagating in the air, thus the refractive index of the propagation medium between the objective lens 202 and the micro-lens is prevented from being reduced, and the resolution of the camera module is prevented from being reduced.

The optical matching medium 30 may be solid or liquid. In the case where the optical matching medium 30 is solid, the optical matching medium 30 may be placed in the sealed cavity 301, meanwhile, an end face of the optical matching medium 30 close to the objective lens 202 is enabled to abut against the objective lens 202, and another end face of the optical matching medium 30 close to the micro-lens array 12 is enabled to abut against the micro-lens array 12, so that shake of the optical matching medium 30 in the sealed cavity 301 can be avoided.

Referring to FIG. 1, in some embodiments, in the case where the optical matching medium 30 is liquid, the body 10 can be provided with a first bore 41 and a second bore 42, the first bore is configured to allow the liquid in the optical matching medium 30 to enter or exit the sealed cavity 301, and the second bore 42 is configured to cooperate with the first bore 41 to allow the liquid in the optical matching medium 30 to enter or exit the sealed cavity 301. Exemplarily, the first bore 41 may be flush with the bottom surface of the side wall of the body 10, the second bore 42 may be flush with the top surface of the side wall of the body 10, during injection of liquid in the optical matching medium 30 into the sealed cavity 301, the liquid may enter the sealed cavity 301 through the first bore 41, meanwhile, gas (for example, air) in the sealed cavity 301 is discharged through the second bore 42 until the sealed cavity 301 is filled with the liquid; in addition, in the process of discharging the liquid in the optical matching medium 30 from the sealed cavity 301, the liquid can be discharged out of the sealed cavity 301 through the first bore 41, and external gas (for example, air) can enter the sealed cavity 301 through the second bore 42 until the liquid is completely discharged out of the sealed cavity 301. It is to be noted that when the optical matching medium 30 includes liquid, the liquid in the optical matching medium 30 may be replaced according to actual needs to match the resolution of the image sensor 11.

Referring to FIG. 2, in some other embodiments, in the case where the optical matching medium 30 is liquid, the body 10 is provided with a first bore 41, the cover 20 is provided with a second bore 42, the first bore 41 is configured to allow the liquid in the optical matching medium 30 to enter or exit the sealed cavity 301, and the second bore 42 is configured to cooperate with the first bore 41 to allow the liquid in the optical matching medium 30 to enter or exit the sealed cavity 301. Exemplarily, the cover plate 201 of the cover 20 is provided with a second bore 42 penetrating therethrough, the bottom of the body 10 is provided with a first bore 41 penetrating therethrough, during injection of liquid in the optical matching medium 30 into the sealed cavity 301, the liquid may enter the sealed cavity 301 through the first bore 41, and meanwhile, gas in the sealed cavity 301 is discharged through the second bore 42 until the sealed cavity 301 is filled with the liquid. In addition, in the process of discharging the liquid in the optical matching medium 30 from the sealed cavity 301, the liquid can be discharged out of the sealed cavity 301 through the first bore 41, and external gas (for example, air) can enter the sealed cavity 301 through the second bore 42 until the liquid is completely discharged out of the sealed cavity 301. It is to be noted that when the optical matching medium 30 includes liquid, the liquid in the optical matching medium 30 may be replaced according to actual needs to match the resolution of the image sensor 11.

Exemplarily, the micro-lens array 12 abuts the surface of the image sensor 11 so that the micro-lens array 12 can seal the image sensor 11 to prevent the image sensor 11 from contacting the optical matching medium 30, and thereby damage to the image sensor 11 can be prevented. Of course, in some other embodiments, an encapsulation layer may further be disposed between the micro-lens array 12 and the image sensor 11, the material of the encapsulation layer may include, for example, one or more of silica gel, Polymethyl Methacrylate (PMMA, organic glass), Perfluorinated Ethylene Propylene copolymer (FEP), Ethylene-Vinyl Acetate copolymer (EVA), Ethylene/Vinyl Acetate copolymer (EMA), and Polyvinyl Butyral (PVB). By arranging the encapsulation layer, direct contact of the image sensor 11 with the optical matching medium 30 can be avoided, and then damage to the image sensor 11 can be prevented.

The embodiments of the disclosure provide a camera module, including a body 10 and a cover 20, which are matched to form the sealed cavity 301; an image sensor 11 and a micro-lens array 12, which are disposed in the sealed cavity 301; and an optical matching medium 30, filling the sealed cavity 301. The cover 20 includes an objective lens 202, a center line of the image sensor 11 is coincident with an optical axis of the objective lens 202, the micro-lens array 12 is located between the image sensor 11 and the objective lens 202, the optical matching medium 30 is disposed between the objective lens 202 and the micro-lens array 12, and a refractive index of the optical matching medium 30 is greater than that of air. Compared with the related art in which air is used as a medium between the objective lens 202 and the image sensor 11, in the embodiment of the disclosure, the optical matching medium 30 with a high refractive index is disposed between the objective lens 202 and the micro-lens array 12, so that the wavelength of the light in the medium can be shortened, the diameter of the corresponding object image can be reduced. Therefore, the photosensitive units with smaller sizes and smaller pitches can be disposed on the image sensor, and the resolution of the camera module can be further improved.

Exemplarily, the refractive index of the micro-lens array 12 can be greater than or equal to that of the optical matching medium 30, so that the loss of incident light can be further avoided, the collection effect of light can be improved, and the imaging quality of the camera module can be further improved.

In the embodiment, the camera module further includes a lens assembly, which is located on one side of the objective lens 202 facing away from the sealed cavity 301, and the lens assembly is detachably connected with the body 10 or the cover 20. The lens assembly can include a plurality of lenses with different functions, such as fluorite lenses, Ultra Low Dispersion (UD) lenses and the like, and the lenses are combined, so that a dimming effect of the camera module is realized. Exemplarily, the plurality of lenses in the lens assembly can be distributed in sequence in the direction of the optical axis. In some embodiments, the lens assembly may be disposed in a column, and the column may be detachably connected to the body 10, such as in a threaded connection, a snap-fit connection, or the like. In some other embodiments, the barrel can be connected with the body 10 or the cover 20 through a telescoping structure, and the distance between the column and the objective lens 202 can be adjusted by arranging the telescoping structure, so that the distance between the lens assembly and the objective lens 202 can be adjusted, and the imaging effect of the camera module can be adaptively adjusted.

Figure 5:
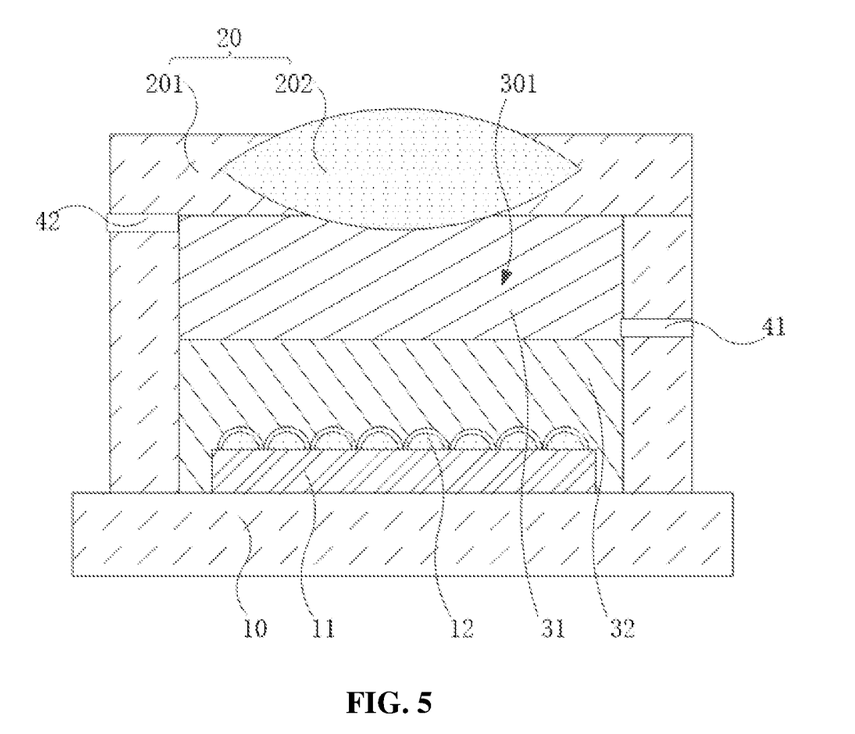
FIG. 5 is a schematic structural diagram III of a camera module according to an embodiment of the disclosure.

With continued reference to FIG. 5, in some other embodiments, the optical matching medium 30 may further include a first medium 31 and a second medium 32 which are distributed in a direction from the objective lens 202 to the micro-lens array 12, and the first medium 31 is located on one side of the second medium 32 close to the objective lens 202. The refractive indexes of the first medium 31 and the second medium 32 are both greater than that of air, and therefore, after light enters the first medium 31 and the second medium 32 with the higher refractive indexes, the wavelength of the light becomes shorter, the diameter of the corresponding object image is smaller, and thereby the resolution between the adjacent object images is improved. In some embodiments, the refractive indexes of the first medium 31 and the second medium 32 are different, so that the wavelength of the incident light in the optical matching medium 30 can be adjusted, the resolution of the camera module can be adjusted, and the collection effect of the incident light can be further improved.

In some embodiments, both the first medium 31 and the second medium 32 may be solid. For example, the first medium 31 and the second medium 32 may be optical lenses. Exemplarily, one side of the first medium 31 facing away from the second medium 32 is in contact with the objective lens 202, another side of the second medium 32 facing away from the second medium 32 is in contact with the micro-lens array 12, meanwhile, the first medium 31 is in contact with the second medium 32, so that incident light passes through the objective lens 202 and then sequentially passes through the first medium 31, the second medium 32, and the micro-lens array 12 until received by the image sensor 11. In a possible implementation mode, the contact face between the first medium 31 and the second medium 32 is planar, so that abutment between the first medium 31 and the second medium 32 is facilitated, entering of an air layer between the first medium 31 and the second medium 32 is avoided, and propagation of light between the first medium 31 and the second medium 32 is facilitated.

In some other embodiments, one of the first medium 31 and the second medium 32 is solid, and the other of the first medium 31 and the second medium 32 is liquid. For example, when the first medium 31 is liquid and the second medium 32 is solid, one side of the second medium 32 facing away from the objective lens 202 is in contact with the micro-lens array 12, and the side wall of the second medium 32 is connected with the side wall of the body 10 in a sealing manner so that the second medium 32, the body 10 and the objective lens 202 can define a confined space filled with the first medium 31. For example, when the first medium 31 is solid and the second medium 32 is liquid, one side of the first medium 31 facing away from the micro-lens array 12 is in contact with the objective lens 202, and the side wall of the first medium 31 is connected with the side wall of the body 10 in a sealing manner, so that the first medium 31, the body 10, and the micro-lens array 12 can define a confined space filled with the second medium 32.

With continued reference to FIG. 5, in embodiments in which the first medium 31 is liquid and the second medium 32 is solid, a first bore 41 and a second bore 42 are further disposed on the body 10 where the first medium 31 is located, for example, the first bore 41 may be flush with the top surface of the second medium 32, the second bore 42 may be flush with the top surface of the side wall of the body 10, facilitating the inflow of liquid through the first bore 41, and discharge of air from the second bore 42 until the sealed cavity 301 is filled with the liquid. It is to be noted that sealing plugs may also be disposed in the first bore 41 and the second bore 42 to prevent liquid from leaking out of the first bore 41 or the second bore 42.

In a possible implementation mode, in the case where the optical matching medium 30 includes liquid, the liquid includes one or more of water, glycerol, cedar oil, benzene, and carbon tetrachloride. The refractive index of water is 1.33, the refractive index of cedar oil is 1.51, the refractive index of glycerol is 1.47, the refractive index of benzene is 1.50, and the refractive index of carbon tetrachloride is 1.46. By arranging liquids with different refractive indexes, the refractive index of the optical matching medium 30 can be adjusted, and thus the resolution of the camera module is adjusted. For example, if the refractive index of the optical matching medium 30 is n (n>1), compared with the common camera module (for example, the resolution is about 0.5 um), the resolution of the camera module according to the embodiment of the disclosure can reach about 0.5/n um; in this case, an image sensor with a higher resolution can be adopted, so that higher resolution of the camera module can be realized. For example, in the case where the optical matching medium 30 is water (the refractive index is 1.33), the resolution of the camera module can reach about 0.38 um; in the case where the optical matching medium 30 is cedar oil (the refractive index is 1.51), the resolution ratio of the camera module can reach about 0.33 um.

Exemplarily, the refractive index of the micro-lens array 12 can be greater than or equal to that of the second medium in the optical matching medium 30, so that the loss of incident light can be further avoided, the collection effect of light can be improved, and the imaging quality of the camera module can be improved.

Figure 6:
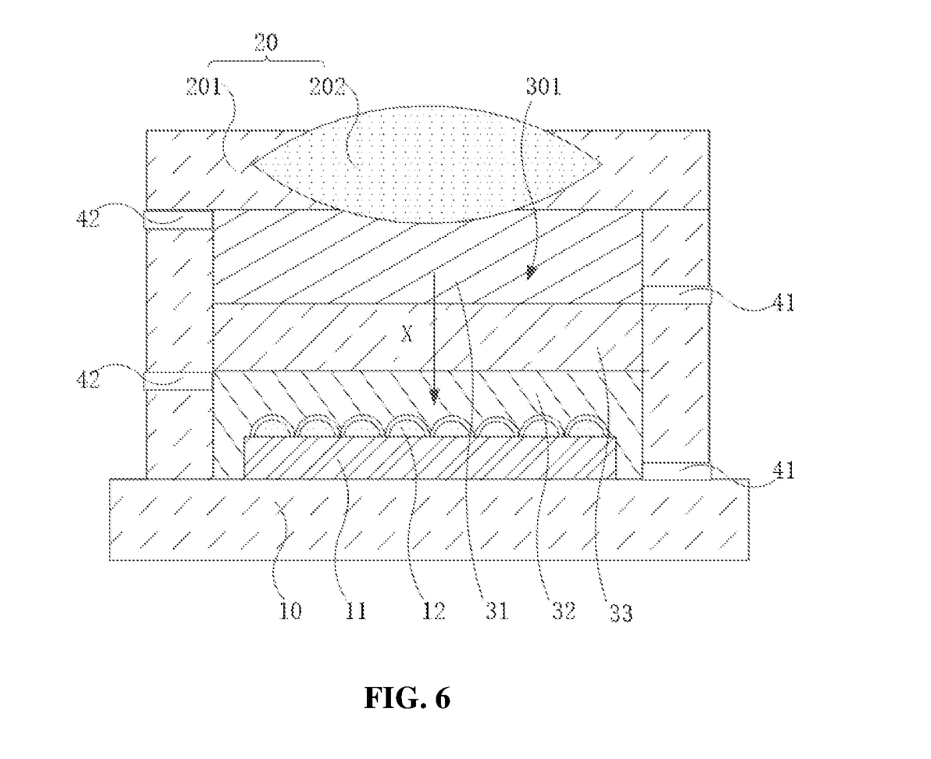
FIG. 6 is a schematic structural diagram IV of a camera module according to an embodiment of the disclosure.

Referring to FIG. 6, in some embodiments, the optical matching medium 30 further includes a third medium 3 which is located between the first medium 31 and the second medium 32, both the first medium 31 and the second medium 32 are liquid, and the third medium 33 is solid. Through arranging the third medium 33, the side wall of the third medium 33 is connected with the side wall of the body 10 in a sealing manner, so that a confined space can be defined by the third medium 33, the body 10 and the objective lens 202, and the confined space is filled with the first medium 31; the third medium 33, the body 10 and the micro-lens array 12 can define a confined space, the confined space is filled with the second medium 32, and the third medium 33 separates the first medium 31 from the second medium 32. Incident light passes through the objective lens 202 and then sequentially passes through the first medium 31, the third medium 33, the second medium 32, and the micro-lens array 12 until received by the image sensor 11.

In some implementation modes, the refractive indexes of the first medium 31, the second medium 32 and the third medium are different, so that the refractive index of the incident light in the optical matching medium 30 can be adjusted, the resolution of the camera module can be adjusted, and the collection effect of the incident light can be further improved. Of course, in some other implementation modes, the refractive indexes of the first medium 31, the second medium 32, and the third medium 33 may also be adjusted according to the actual use condition.

In some other embodiments, all of the first medium 31, the second medium 32 and the third medium 33 may be solid. For example, the first medium 31, the second medium 32 and the third medium 33 can be made of optical glass or resin. The contact face between the first medium 31 and the third medium 33 may be planar, and the contact face between the second medium 32 and the third medium 33 may be planar, so that entering of an air layer between the first medium 31 and the third medium 33 and between the second medium 32 and the third medium 33 can be avoided, and propagation of light between the first medium 31 and the third medium 33 and between the second medium 32 and the third medium 33 is facilitated.

Of course, in some other embodiments, one of the first medium 31, the second medium 32 and the third medium 33 is liquid, and the remaining ones are solid, for example, the first medium 31 and the second medium 32 are solid, the third medium 33 is liquid, where the first medium 31, the second medium 32 and the body 10 define a confined space filled with the third medium 33.

With continued reference to FIG. 6, in an embodiment that the first medium 31 and the second medium 32 are liquid and the third medium is solid, the side wall of the body 10 where the first medium 31 is located is further provided with a first bore 41 and a second bore 42, the first bore 41 is configured to allow the liquid in the optical matching medium 30 to enter or exit the body where the first medium 31 is located, and the second bore 42 is configured to cooperate with the first bore 41 to allow the liquid in the optical matching medium 30 to enter or exit the body where the first medium is located; the side wall of the body 10 where the second medium 32 is located is further provided with a first bore 41 and a second bore 42, the first bore 41 is configured to allow the liquid in the optical matching medium 30 to enter or exit the body where the second medium 32 is located, and the second bore 42 is configured to cooperate with the first bore 41 to allow the liquid in the optical matching medium 30 to flow out of the body 19 where the second medium 32 is located. As described in the above embodiment, on the body 10 where the first medium 31 is located, the first bore 41 is flush with the top surface of the third medium 33, and the second bore 42 is flush with the top surface of the side wall of the body 10; on the body 10 where the second medium 32 is located, the second bore 42 is flush with the bottom surface of the third medium 33, and the first bore 41 is flush with the bottom surface of the side wall of the body 10.

Referring to FIGS. 5 and 6, in the embodiment, the refractive index of the optical matching medium 30 gradually increases in a direction parallel to the optical axis of the objective lens 202 and pointing from the objective lens 202 to the micro-lens array 12. The direction parallel to the optical axis of the objective lens 202 and pointing from the objective lens 202 to the micro-lens array 12 is the X direction in the figure. The materials in the first medium 31, the second medium 32 and the third medium 33 are uniformly distributed, so that the refractive indexes are equal everywhere: the refractive index of the first medium 31, for example, can be n1, the refractive index of the second medium 32, for example, can be n2, and the refractive index of the third medium 33, for example, can be n3. In embodiments in which the optical matching medium 30 includes the first medium 31 and the second medium 32, the refractive index n2 of the second medium 32 is greater than the refractive index n1 of the first medium 31, so that the refractive indexes of the first medium 31 and the second medium 32 gradually increase in the X-direction in the figure. In embodiments in which the optical matching medium 30 includes the first medium 31, second medium 32 and the third medium 33, the refractive index n2 of the second medium 32 is greater than the refractive index n3 of the third medium 33, the refractive index n3 of the third medium 33 is greater than the refractive index n1 of the first medium 31, so that the refractive indexes of the first medium 31, the third medium and the second medium 32 gradually increase in the X-direction in the figure. Through the arrangement, after incident light enters the optical matching medium 30, the wavelength of the light is gradually shortened, and then the resolution ratio of the camera module is gradually improved.

Referring to FIGS. 5 and 6, in the embodiment, the refractive indexes of the first medium 31, second medium 32 and the third medium gradually increase in a direction parallel to the optical axis of the objective lens 202 and pointing from the objective lens 202 to the micro-lens array 12. The direction in a direction parallel to the optical axis of the objective lens 202 and pointing from the objective lens 202 to the micro-lens array 12 is the X direction in the figure. By adjusting the densities of the first medium 31, the second medium 32 and the third medium 33, the refractive index of the first medium 31 in the X direction can be gradually increased from c1 to c2, the refractive index of the third medium 33 in the X direction can be gradually increased from c3 to c4, and the refractive index of the second medium 32 in the X direction can be gradually increased from c5 to c6. In embodiments in which the optical matching medium 30 includes the first medium 31 and the second medium 32, the maximum refractive index c2 in the first medium 31 is smaller than the minimum refractive index c5 in the second medium 32, so that the refractive indexes of the first medium 31 and the second medium 32 gradually increase in the X-direction in the figure. In the embodiment in which the optical matching medium 30 includes the first medium 31, second medium 32 and the third medium 33, the maximum refractive index c2 in the first medium 31 is smaller than the minimum refractive index c3 in the third medium 33, the maximum refractive index c4 in the third medium 33 is smaller than the minimum refractive index c5 in the second medium 32, so that that the refractive indexes of the first medium 31, the third medium 33 and the second medium 32 gradually increase in the X-direction in the figure. Through the arrangement, after incident light enters the optical matching medium 30, the wavelength of the light is gradually shortened, and thus the resolution ratio of the camera module is gradually improved.

Exemplarily, the refractive index of the micro-lens array 12 can be greater than or equal to the maximum refractive index of the second medium 32 in the optical matching medium 30, so that the loss of incident light can be further avoided, the collection effect of light can be improved, and the imaging quality of the camera module can be improved.

It is to be noted that the optical matching medium 30 of the embodiment of the disclosure may further include three or more media, and the specific number of media may be adjusted according to actual use needs, and the embodiment is not intended to be limiting herein.

Figure 7:
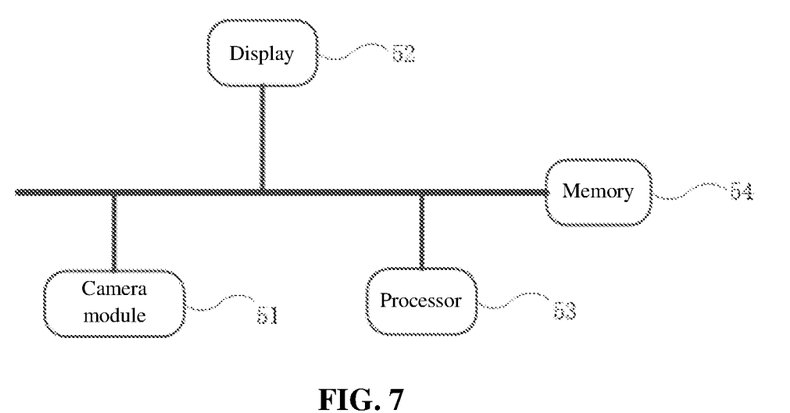
FIG. 7 is a schematic structural diagram of an electronic device according to an embodiment of the disclosure.

Referring to FIG. 7, FIG. 2, and FIG. 1, the embodiments of the disclosure further provide an electronic device including the camera module 51 of any of the embodiments described above, and the camera module 51 is configured to acquire an optical image. The electronic device further includes a display 52, a processor 53, and a memory 54. The display is electrically coupled to the camera module 51, the memory 54 is electrically coupled to the processor 53, the processor 53 is further electrically coupled to the camera module 51, the processor 53 may be configured to convert digital signals into digital images, and the memory 54 may be configured to store the digital images to enable the display to display optical images.

It is to be noted that the electronic device provided in the embodiment of the disclosure can be applied to a personal computer, a portable display device, a smart phone and the like.

The electronic device according to the embodiments of the disclosure includes a body 10 and a cover 20, which are matched to form a sealed cavity 301; an image sensor 11 and a micro-lens array 12, which are disposed in the sealed cavity 301; and an optical matching medium 30, filling the sealed cavity 301. The cover 20 includes an objective lens 202, the center line of the image sensor 11 is coincident with the optical axis of the objective lens 202, the micro-lens array 12 is located between the image sensor 11 and the objective lens 202, the optical matching medium 30 is disposed between the objective lens 202 and the micro-lens array 12, and the refractive index of the optical matching medium 30 is greater than the refractive index of air. Compared with the related art in which air is used as a medium between the objective lens 202 and the image sensor 11, in the embodiment of the disclosure, the optical matching medium 30 with a high refractive index is disposed between the objective lens 202 and the micro-lens array 12, so that the wavelength of the light in the medium can be shortened, the diameter of the corresponding object image is reduced. Therefore, photosensitive units with smaller sizes and smaller pitches can be disposed on the image sensor, and the resolution of the camera module can be further improved.

It will be apparent to those skilled in art that division of functional modules described above is merely exemplified for convenience and brevity of description. In practice, the above-mentioned function assignment may be completed by different function modules as required, i.e., the internal structure of the device is divided into different program modules to complete all or part of the above-described functions Specific working procedures of the device described above may be referred to corresponding procedures in the aforementioned method embodiment, and are not repeated herein.

Finally, it is to be noted that the above embodiments serve only to illustrate the technical solutions of the disclosure and not to limit the same; although the disclosure has been described in detail with reference to embodiments, it will be understood by those of ordinary skill in the art that the technical solutions described in the embodiments can still be modified, or part or all of the technical features can be equivalently replaced; and the modification or replacement does not make the essence of the corresponding technical solutions deviate from the scope of the technical solution of each embodiment of the disclosure.

The invention claimed is:

1. A camera module, comprising:
a body and a cover, which are matched to form a sealed cavity;
an image sensor and a micro-lens array, which are disposed in the sealed cavity;
an optical matching medium, filling the sealed cavity;
wherein the cover comprises an objective lens, a center line of the image sensor is coincident with an optical axis of the objective lens, the micro-lens array is located between the image sensor and the objective lens, the optical matching medium is disposed between the objective lens and the micro-lens array, and a refractive index of the optical matching medium is greater than a refractive index of air; and,
wherein the optical matching medium comprises liquid, the body is provided with a first bore, the body or the cover is provided with a second bore, the first bore is configured to allow the liquid in the optical matching medium to enter or exit the sealed cavity, and the second bore is configured to cooperate with the first bore to allow the liquid in the optical matching medium to enter or exit the sealed cavity.

2. The camera module of claim 1, wherein the optical matching medium comprises a first medium and a second medium, the first medium and the second medium are distributed in a direction from the objective lens to the micro-lens array, the first medium is located on one side of the second medium close to the objective lens, and refractive indexes of the first medium and the second medium are different; and,
wherein one of the first medium and the second medium is solid, and the other of the first medium and the second medium is liquid.

3. The camera module of claim 1, wherein one end of the optical matching medium close to the objective lens is in contact with the objective lens, and another end of the optical matching medium close to the micro-lens array is in contact with the micro-lens array.

4. The camera module of claim 1, wherein a refractive index of the micro-lens array is greater than or equal to the refractive index of the optical matching medium.

5. The camera module of claim 1, wherein the liquid comprises one or more of water, glycerol, cedar oil, benzene, and carbon tetrachloride.

6. The camera module of claim 1, wherein the image sensor comprises a charge coupled device or a complementary metal oxide semiconductor device.

7. The camera module of claim 1, further comprising a lens assembly located on one side of the objective lens facing away from the sealed cavity, and detachably connected with the body or the cover.

8. The camera module of claim 1, wherein the micro-lens array comprises a plurality of micro-lenses distributed in an array, the image sensor comprises a plurality of photosensitive units distributed in an array, and the plurality of micro-lenses are in one-to-one correspondence with the plurality of photosensitive units.

9. A camera module, comprising:
a body and a cover, which are matched to form a sealed cavity;
an image sensor and a micro-lens array, which are disposed in the sealed cavity; and
an optical matching medium, filling the sealed cavity; and,
the cover comprises an objective lens, a center line of the image sensor is coincident with an optical axis of the objective lens, the micro-lens array is located between the image sensor and the objective lens, the optical matching medium is disposed between the objective lens and the micro-lens array, and a refractive index of the optical matching medium is greater than a refractive index of air;
the optical matching medium comprises a first medium and a second medium, the first medium and the second medium are distributed in a direction from the objective lens to the micro-lens array, the first medium is located on one side of the second medium close to the objective lens, and refractive indexes of the first medium and the second medium are different; and
the optical matching medium further comprises a third medium which is located between the first medium and the second medium, both the first medium and the second medium are liquid, and the third medium is solid.

10. The camera module of claim 9, wherein the refractive indexes of the first medium, the second medium and the third medium gradually increase in a direction parallel to the optical axis of the objective lens and pointing from the objective lens to the micro-lens array.

11. A camera module, comprising:
a body and a cover, which are matched to form a sealed cavity;
an image sensor and a micro-lens array, which are disposed in the sealed cavity; and
an optical matching medium, filling the sealed cavity; and,
wherein the cover comprises an objective lens, a center line of the image sensor is coincident with an optical axis of the objective lens, the micro-lens array is located between the image sensor and the objective lens, the optical matching medium is disposed between the objective lens and the micro-lens array, and a refractive index of the optical matching medium is greater than a refractive index of air; and,
the refractive index of the optical matching medium gradually increases in a direction parallel to the optical axis of the objective lens and pointing from the objective lens to the micro-lens array.

12. The camera module of claim 11, wherein the optical matching medium comprises a first medium and a second medium, the first medium and the second medium are distributed in a direction from the objective lens to the micro-lens array, the first medium is located on one side of the second medium close to the objective lens, and refractive indexes of the first medium and the second medium are different.

13. The camera module of claim 12, wherein both the first medium and the second medium are solid.

14. The camera module of claim 12, wherein one of the first medium and the second medium is solid, and the other of the first medium and the second medium is liquid.

15. The camera module of claim 11, wherein one end of the optical matching medium close to the objective lens is in contact with the objective lens, and another end of the optical matching medium close to the micro-lens array is in contact with the micro-lens array.

16. The camera module of claim 11, wherein a refractive index of the micro-lens array is greater than or equal to the refractive index of the optical matching medium.

17. The camera module of claim 11, further comprising a lens assembly located on one side of the objective lens facing away from the sealed cavity, and detachably connected with the body or the cover.

18. An electronic device, comprising:
the camera module of claim 1, configured to acquire an optical image; and
a display, electrically coupled with the camera module, and configured to display the optical image.

19. An electronic device, comprising:
the camera module of claim 9, configured to acquire an optical image; and
a display, electrically coupled with the camera module, and configured to display the optical image.

20. An electronic device, comprising:
the camera module of claim 11, configured to acquire an optical image; and
a display, electrically coupled with the camera module, and configured to display the optical image.

* * * * *